United States Patent [19]
Allen et al.

[11] 4,241,253
[45] Dec. 23, 1980

[54] EPITHERMAL NEUTRON DETECTOR

[75] Inventors: Linus S. Allen; Wyatt W. Givens, both of Dallas; William R. Mills, Jr., Duncanville, all of Tex.

[73] Assignee: Mobil Oil Corporation, New York, N.Y.

[21] Appl. No.: 963,532

[22] Filed: Nov. 24, 1978

[51] Int. Cl.³ .......................... G01T 3/00; H01J 47/12
[52] U.S. Cl. ..................................... 250/390; 250/392
[58] Field of Search ............... 250/264, 266, 269, 390, 250/391, 392, 267

[56] References Cited
U.S. PATENT DOCUMENTS

| 2,680,201 | 6/1954 | Scherbatskoy | 250/267 |
| 3,264,477 | 8/1966 | Hull | 250/390 |
| 3,382,363 | 5/1968 | Gant et al. | 250/390 |
| 3,774,033 | 11/1973 | Scott et al. | 250/266 |
| 3,906,224 | 9/1975 | Scott et al. | 250/264 |
| 4,074,136 | 2/1978 | Heinzelmann et al. | 250/390 |

Primary Examiner—Bruce C. Anderson
Attorney, Agent, or Firm—C. A. Huggett; William D. Jackson

[57] ABSTRACT

A radioactivity well logging tool employs an epithermal neutron detector having a thermal neutron counter surrounded by a thermal neutron shield. Located between the counter and the shield is a neutron moderating material for slowing down epithermal neutrons penetrating the thermal neutron shield to enable their counting by the thermal neutron counter.

4 Claims, 2 Drawing Figures

4,241,253

EPITHERMAL NEUTRON DETECTOR

BACKGROUND OF THE INVENTION

This invention relates to radioactivity well logging and more particularly to an improved epithermal neutron detector for use in a radioactivity borehole logging tool.

In neutron-neutron logging, a source of primary radiation irradiates the formations surrounding a borehole with neutrons. The resulting secondary radiation is measured by detectors axially spaced from the source within the borehole. Such secondary radiation includes epithermal neutrons, thermal neutrons, and thermal neutron capture gamma rays. U.S. Pat. No. 4,005,290 to Allen discloses a borehole logging tool, a neutron source, and epithermal and thermal neutron detectors. Both the epithermal and thermal neutron detectors are of the proportional counter type disclosed in U.S. Pat. No. 3,102,198 to Bonner and filled with helium-3 gas at superatmospheric pressure preferably in the order of about two to twenty atmospheres absolute. The epithermal neutron detectors are further surrounded with cadmium shielding to prevent thermal neutrons from reaching the active volume of the detectors. At least two electrodes in electrically conductive contact with the helium-3 gas are connected with a voltage source to establish an electrostatic field for the collection of ionized gas particles produced in the zone of the helium-3 gas upon entry of epithermal neutrons from the surrounding formations.

SUMMARY OF THE INVENTION

In accordance with the present invention there is provided an epithermal neutron detector of the type having a thermal neutron counter, a thermal neutron shield surrounding the counter, and an epithermal neutron moderating material located between the counter and the shield for slowing down epithermal neutrons which penetrate the shield to enable those neutrons to be more readily absorbed by the counter. The thickness of the moderating material is at least sufficient to achieve a neutron counting rate equal to the highest possible counting rate obtainable when the counter completely fills the inside diameter of the thermal neutron shield.

In a further aspect, the thickness of the moderating material bears a relationship to the diameter of the counter so as to yield a maximized counting rate from the counter. This relationship is identified by the ratio of the diameter of the counter to the outer diameter of the moderating material. There is also a minimum diameter for the counter below which no improvement in counting rate is achieved by a moderated detector over an unmoderated detector.

DESCRIPTION OF THE PREFERRED EMBODIMENT

The present invention is directed to a new and improved epithermal neutron detector for use in radioactivity well logging.

Figure 1:
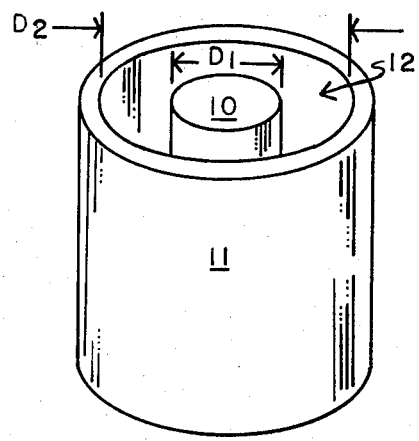
FIG. 1 illustrates the epithermal neutron detector of the present invention.

Referring now to FIG. 1, a neutron-sensitive counter 10, preferably a proportional counter filled with helium-3 gas, is surrounded by a thermal neutron shield 11, preferably a thin layer of cadmium metal. Filling the space 12 between the counter 10 and the shield 11 is a neutron moderating material, such as polyethylene, for slowing down epithermal neutrons which penetrate the thermal neutron shield 11 to enable these neutrons to be more readily absorbed by the neutron counter 10. This occurs due to the moderator's effect in spreading the neutron counting rate in time. Energy loss due to scattering in the moderator lowers the speed of the neutrons and thus delays their arrival at the counter 10. This delay in turn reduces the instantaneous maximum counting rate. This effect of a neutron moderating material between the neutron counter and the thermal neutron shield of an epithermal neutron detector has been disclosed in U.S. Pat. No. 2,680,201 to Scherbatskoy.

Figure 2:
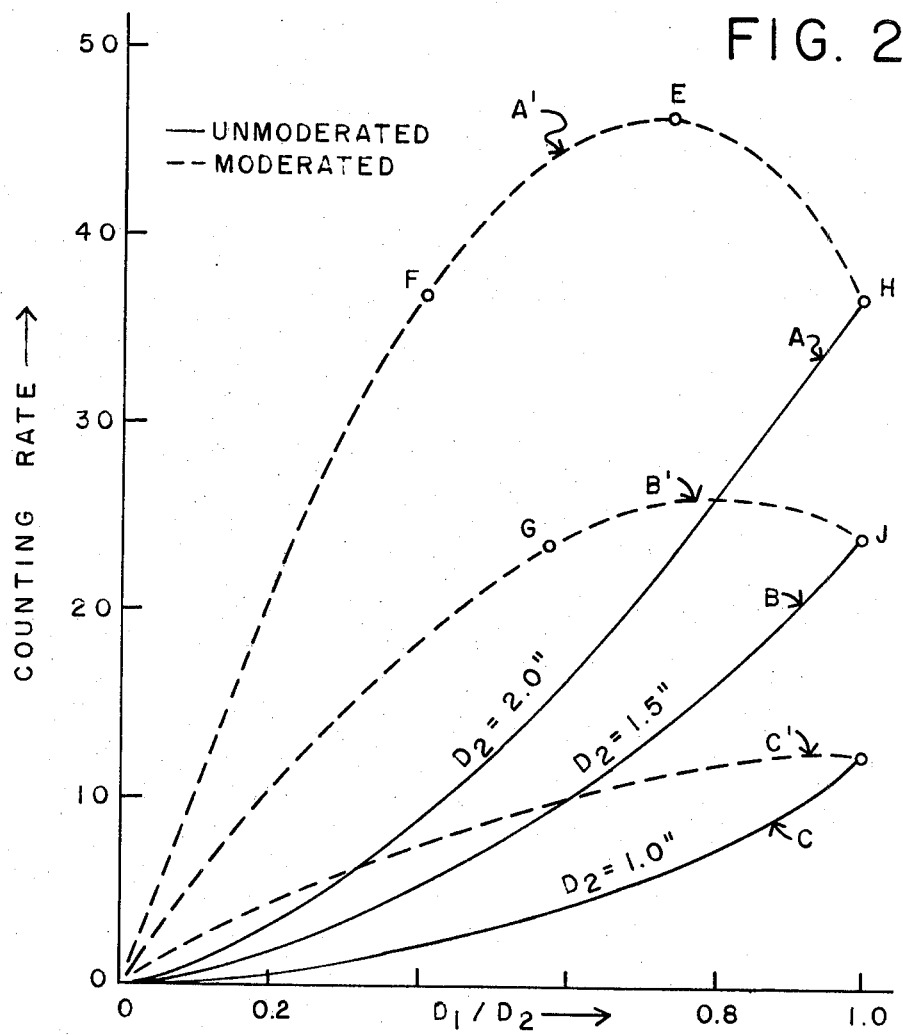
FIG. 2 illustrates counting rate curves for varying sizes of the epithermal neutron detector of FIG. 1.

However, it is a specific feature of the present invention to provide for an epithermal neutron detector in which the relationship between the diameter of the neutron counter and the thickness of the moderating material surrounding the counter produces a maximized epithermal neutron counting rate. This relationship is illustrated in FIG. 2. Solid curve A shows the variation in counting rate for a 10-atmosphere, helium-3 counter of varying diameters $D_1$ enclosed within a cadmium thermal neutron shield with fixed inside diameter $D_2$ of 2.0 inches and placed within a flux of epithermal neutrons. The counter and shield are 6 inches in length. The dashed curve A' shows the variation in counting rate when the space between the counter and cadmium shield is filled with the neutron moderator polyethylene. The peak of curve A' represents the highest possible counting rate for such epithermal neutron detector. To achieve this counting rate, the $D_1/D_2$ ratio of curve A' is about 0.725. Consequently, the neutron counter diameter $D_1$ is about 1.5 inches, thereby indicating that the neutron moderator polyethylene should be about 0.25 inch thick.

The solid curve B and dashed curve B' of FIG. 2 further show the variation in counting rate for an epithermal neutron detector with a smaller thermal neutron shield diameter $D_2$ of about 1.5 inches. The highest possible counting rate for this detector occurs for a $D_1/D_2$ ratio of about 0.82. Consequently, the neutron counter diameter is about 1.23 inches, thereby indicating a polyethylene moderator thickness of about 0.135 inch. It can therefore be seen that the amount of counting rate improvement for a moderated over an unmoderated detector varies with the diameters of the particular helium-3 counter and thermal neutron shield. However, it can be further seen by referring to the curves C and C' that there is a minimum neutron counter diameter for which there is no improvement in counting rate resulting from the addition of the neutron moderating material. For a polyethylene moderating material, this minimum diameter is about 1.0 inch. For this 1.0-inch diameter counter, the highest possible counting rate occurs for a $D_1/D_2$ ratio of about 1.0, meaning that a thermal neutron shield of 1.0-inch diameter immediately surrounds the neutron counter. The addition of moderating material would produce no greater counting rate. Therefore, for a given moderating material there is a lower limit on the diameter $D_2$ below which the moderator is ineffective in producing an epithermal neutron detector of comparable sensitivity to an unmoderated detector.

Although polyethylene has been used to illustrate the benefits of neutron moderators within the thermal neutron shield of an epithermal neutron detector, other materials, either fluid or solid, having a hydrogen atom density comparable to that of polyethylene will produce similar results to that shown in FIG. 2. Common examples are plastics, waxes, and crude oils.

As has been discussed, the peaks of the dashed curves in FIG. 2 represent the highest possible counting rates for given moderated detectors. On the other hand, points such as F and G on the dashed curves A' and B', respectively, represent moderated detectors having a minimum amount of moderating material, yet achieving a counting rate equal to the highest possible counting rate obtainable when the neutron counter completely fills the inside diameter of the thermal neutron shield as shown by the points H and J. This feature can be important when the material comprising the neutron counter is more expensive on a per unit volume basis than the neutron moderating material. This is particularly true for the preferred embodiment wherein the necessary volume of helium-3 gas for filling the neutron counter is more expensive on a per unit volume basis than a polyethylene moderating material.

We claim:

1. An epithermal neutron detector comprising:
   (a) a thermal neutron counter,
   (b) a thermal neutron shield surrounding said counter, and
   (c) an epithermal neutron moderating material located between said counter and said shield for slowing down epithermal neutrons which penetrate said shield to enable those neutrons to be more readily absorbed by said counter, the thickness of said moderating material and the ratio of the diameter of said counter to the outer diameter of said moderating material being such that said counter yields a maximized neutron counting rate greater than the highest possible counting rate obtainable when said counter completely fills the inside diameter of said thermal neutron shield.

2. The detector of claim 1 wherein said counter is a proportional counter.

3. The detector of claim 2 wherein said proportional counter is filled with helium-3 gas.

4. The detector of claim 3 wherein the minimum diameter of said counter below which no improvement in neutron absorption is achieved by the moderated detector over an unmoderated detector is about one inch.

* * * * *